United States Patent
Roberge

(10) Patent No.: US 10,612,414 B2
(45) Date of Patent: Apr. 7, 2020

(54) PANEL BASED HEAT EXCHANGER

(71) Applicant: United Technologies Corporation, Farmington, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 119 days.

(21) Appl. No.: 15/243,249

(22) Filed: Aug. 22, 2016

(65) Prior Publication Data

US 2018/0051935 A1    Feb. 22, 2018

(51) Int. Cl.
| | |
|---|---|
| *F28D 9/00* | (2006.01) |
| *F01D 25/12* | (2006.01) |
| *F28F 3/08* | (2006.01) |
| *F28D 21/00* | (2006.01) |

(52) U.S. Cl.
CPC ........... *F01D 25/12* (2013.01); *F28D 9/0018* (2013.01); *F28F 3/086* (2013.01); *F05D 2260/213* (2013.01); *F28D 2021/0021* (2013.01); *Y02T 50/675* (2013.01)

(58) Field of Classification Search
CPC ...... F28D 9/0012; F28D 9/0043; F28D 9/005; F28F 3/086
See application file for complete search history.

(56) References Cited

U.S. PATENT DOCUMENTS

| | | | |
|---|---|---|---|
| 1,669,062 A  * | 5/1928 | Ernst Menzel | ....... F28D 9/0012 165/167 |
| 3,255,818 A | 6/1966 | Beam et al. | |
| 3,785,435 A  * | 1/1974 | Stein | ......... F02C 7/08 165/166 |
| 4,005,988 A | 2/1977 | Paulonis et al. | |
| 4,122,992 A | 10/1978 | Duvall et al. | |
| 4,285,397 A  * | 8/1981 | Ostbo | ..... F28F 3/086 165/163 |

(Continued)

FOREIGN PATENT DOCUMENTS

| | | |
|---|---|---|
| EP | 2711297 | 3/2014 |
| WO | 9844305 | 10/1998 |

OTHER PUBLICATIONS

Extended European Search Report for EP Application No. 17187333.4, dated Jul. 2, 2018.

(Continued)

*Primary Examiner* — Eric S Ruppert
(74) *Attorney, Agent, or Firm* — Carlson, Gaskey & Olds, P.C.

(57) ABSTRACT

A heat exchanger includes a heat exchanger body having a plurality of stacked panels defining an internal manifold and an external manifold. Each of the stacked panels includes an internal structure partially defining an internal manifold, an external structure partially defining the external manifold, and a plurality of ribs connecting the internal structure to the external structure. Each of the ribs further comprises a channel protruding into the rib and being paired with a corresponding rib of an adjacent panel, such that each of the ribs and the corresponding rib defining a cooling passage fluidly connecting the internal manifold to the external manifold. Each of the stacked panels is bonded to at least one adjacent stacked panel.

15 Claims, 5 Drawing Sheets

(56) References Cited

U.S. PATENT DOCUMENTS

| | | | |
|---|---|---|---|
| 4,431,050 A * | 2/1984 | Martin | F02C 7/08 |
| | | | 165/166 |
| 6,446,712 B1 | 9/2002 | Wu et al. | |
| 6,715,293 B2 | 4/2004 | Sillence et al. | |
| 6,758,388 B1 | 7/2004 | Leholm et al. | |
| 9,186,627 B2 | 11/2015 | McGinnis et al. | |
| 2007/0114269 A1 | 5/2007 | Straza | |
| 2009/0049794 A1* | 2/2009 | Barone | B23K 1/0012 |
| | | | 52/745.21 |
| 2014/0116664 A1 | 5/2014 | Landre | |

OTHER PUBLICATIONS

Partial European Search Report for Application No. 17187333.4 dated Mar. 19, 2018.

* cited by examiner

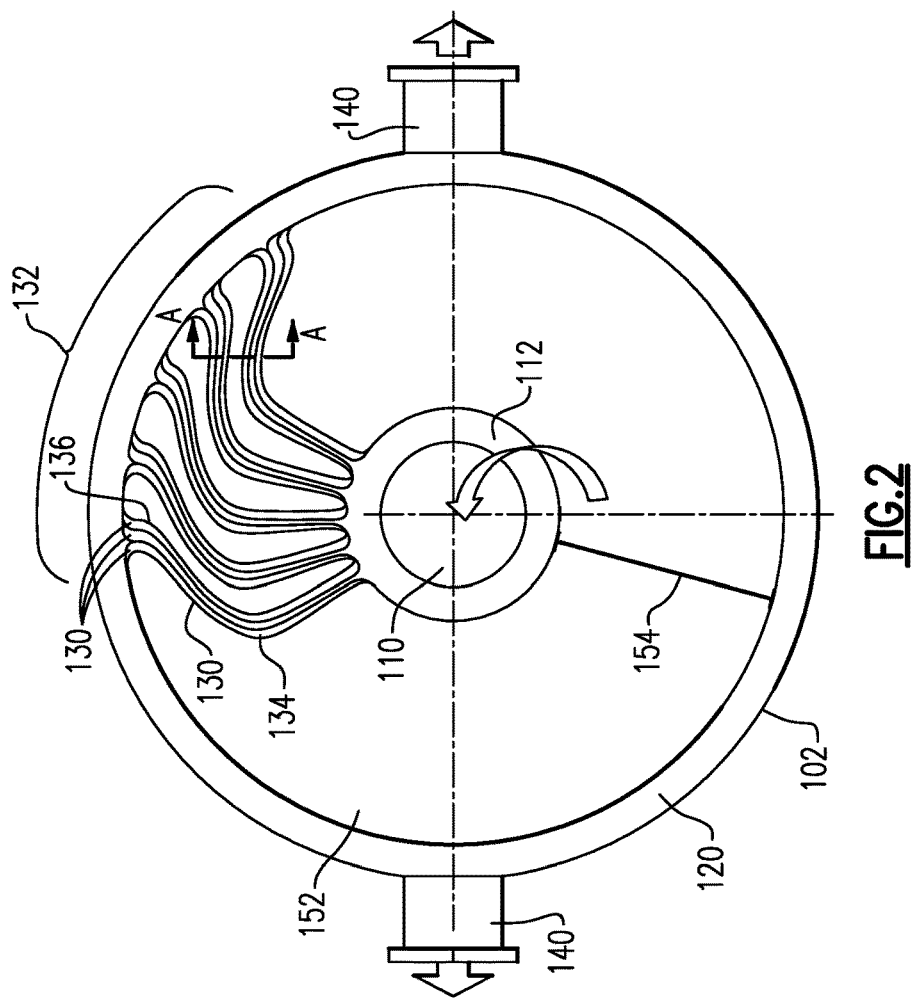
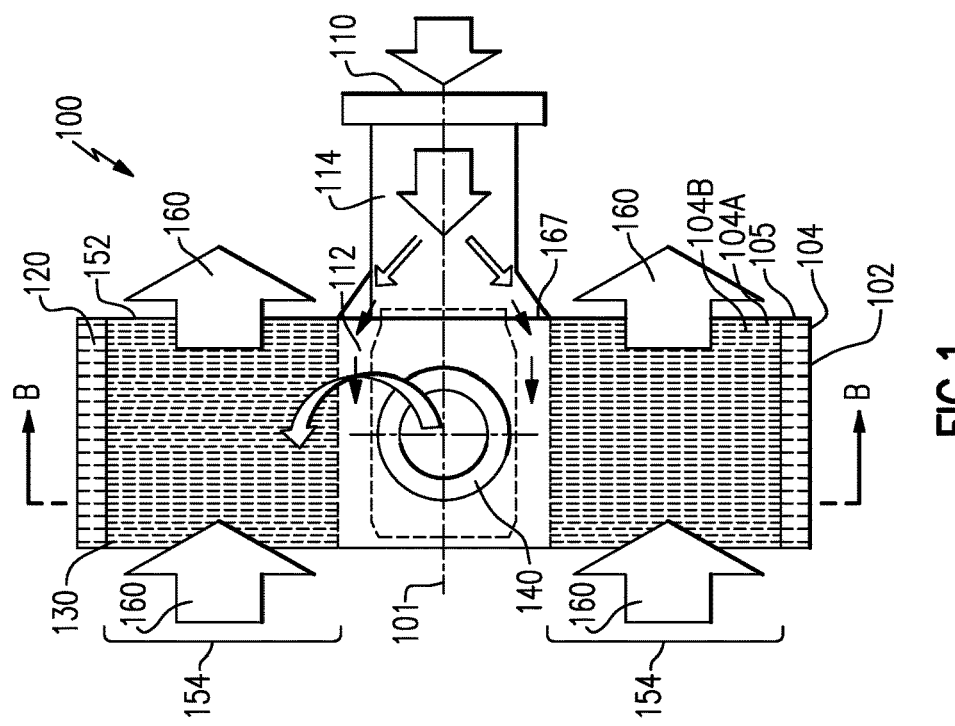
FIG.2
FIG.1

PANEL BASED HEAT EXCHANGER

TECHNICAL FIELD

The present disclosure relates generally to heat exchangers for use in aircraft, and more specifically to an aircraft heat exchanger constructed at least partially of stacked panels.

BACKGROUND

Modern aircraft engines, such as the gas powered turbine engines incorporated in commercial aircraft, operate at extremely high temperatures. As a result of the high temperatures, components within the engine are cooled using a cooling flow from a lower temperature working fluid, such as air. In order to cool the coolant, high temperature/high pressure heat exchangers are utilized. In such a heat exchanger, hot coolant is passed through one or more passages, and a cross flow of a cooler fluid, such as lower temperature flow, is passed across the outside of the passage. Convective cooling transfers heat from the fluid in the passage to the cross flow, and the cross flow draws the heat away from the coolant in the passage.

Current high temperature/high pressure heat exchangers, such as those required by cooled cooling air aircraft systems, are subjected to severe design constraints. To meet the design constraints, the heat exchangers typically use discrete drawn tubes that create passages for the high pressure and high temperature flow of coolant. While this solution is viable in some systems, the use of drawn tubing can limit the materials that can be used to construct the heat exchanger and can limit the use of secondary, or augmenting, heat transfer features within the heat exchanger.

SUMMARY OF THE INVENTION

In one exemplary embodiment a heat exchanger includes a heat exchanger body comprising a plurality of stacked panels defining an internal manifold and an external manifold, each of the stacked panels including an internal structure partially defining an internal manifold, an external structure partially defining the external manifold, and a plurality of ribs connecting the internal structure to the external structure, wherein each of the ribs further comprises a channel protruding into the rib and being paired with a corresponding rib of an adjacent panel, such that each of the ribs and the corresponding rib defining a cooling passage fluidly connecting the internal manifold to the external manifold, and each of the stacked panels being bonded to at least one adjacent stacked panel.

In another example of the above described heat exchanger each of the passages defines a tortuous fluid passage in plane with a pair of the stacked panels.

In another example of any of the above described heat exchangers the tortuous fluid passage allows thermal growth of the passage without requiring thermal growth of the external manifold.

In another example of any of the above described heat exchangers each of the stacked panels is bonded to at least one adjacent stacked panel via a transient liquid phase bond.

In another example of any of the above described heat exchangers each of the passages includes at least one augmentation element extending outward from an outer surface of the passage.

In another example of any of the above described heat exchangers the augmentation element includes at least one of a chevron, a pin, and a fin.

In another example of any of the above described heat exchangers each of the passages includes at least one augmentation element extending inward from an inner surface of the passage.

In another example of any of the above described heat exchangers each of the passages includes at least one augmentation element extending outward from an outer surface of the passage.

In another example of any of the above described heat exchangers each of the stacked panels includes an open region configured to allow a cooling flow to flow across each of the passages.

In another example of any of the above described heat exchangers each of the stacked panels is clocked, relative to a radial alignment of each adjacent panel, such that the passages are staggered circumferentially.

In another example of any of the above described heat exchangers each of the passages partially axially overlaps at least one passage in an adjacent plane.

In another example of any of the above described heat exchangers each of the passages defines a local turbulence immediately downstream of the passage within the cooling flow.

In another example of any of the above described heat exchangers each of the panels includes at least one registration component, and wherein each registration component is aligned with one registration component of all of the plurality of panels.

In another example of any of the above described heat exchangers each of the registration component further comprises an engine mount.

In another example of any of the above described heat exchangers each of the passages includes a cross section normal to an expected fluid flow direction through the passage, and wherein the cross section is one of circular, trapezoidal, and rectangular.

In another example of any of the above described heat exchangers each panel comprises a vibrational coupling feature connecting the panel to at least one adjacent panel such that the panels are vibrationally coupled, and wherein the vibrational coupling feature is connected to the at least one adjacent panel via one of a bonding coupling and a contact coupling.

An exemplary method for constructing a heat exchanger body includes stacking a plurality of heat exchanger panels, each panel including an inner structure, an outer structure, and a plurality of ribs connecting the inner structure to the outer structure, aligning each heat exchanger panel with at least one adjacent heat exchanger panel such that each of the ribs is paired with a rib of an adjacent panel, and each pair defines a fluid passage, and bonding each of the panels to each adjacent panel.

In another example of the above described exemplary method for constructing a heat exchanger body bonding each of the panels to each adjacent panels comprises creating a transient liquid phase bond.

In another example of any of the above described exemplary methods for constructing a heat exchanger body bonding each of the panels to each adjacent panel comprises bonding a set of panels with each panel being constructed of at least one of a metallic material, an intermetallic material and a high-conductivity non-metallic material.

In another example of any of the above described exemplary methods for constructing a heat exchanger body aligning each heat exchanger panel with at least one adjacent heat exchanger panel comprising radially clocking each sequential panel in the plurality of stacked heat exchanger panels, such that the passages are radially staggered.

In another example of any of the above described exemplary methods for constructing a heat exchanger body each of the defined fluid passages is a tortuous passage including curves in plane with the stacked panels including the rib defining the passage.

Another example of any of the above described exemplary methods for constructing a heat exchanger body further includes including at least two curves in plane with the stacked panels including the rib defining the passage.

An exemplary method for accommodating relative thermal growth of a stacked panel heat exchanger includes bending a tortuous fluid passage at a curve in plane with a panel, thereby allowing thermal growth of the fluid passage without requiring thermal growth of an external manifold.

These and other features of the present invention can be best understood from the following specification and drawings, the following of which is a brief description.

BRIEF DESCRIPTION OF THE DRAWINGS

FIG. 1 schematically illustrates an exemplary heat exchanger for utilization within a gas turbine engine.

FIG. 2 schematically illustrates a top view of the heat exchanger of FIG. 1.

DETAILED DESCRIPTION OF AN EMBODIMENT

Figure 3:
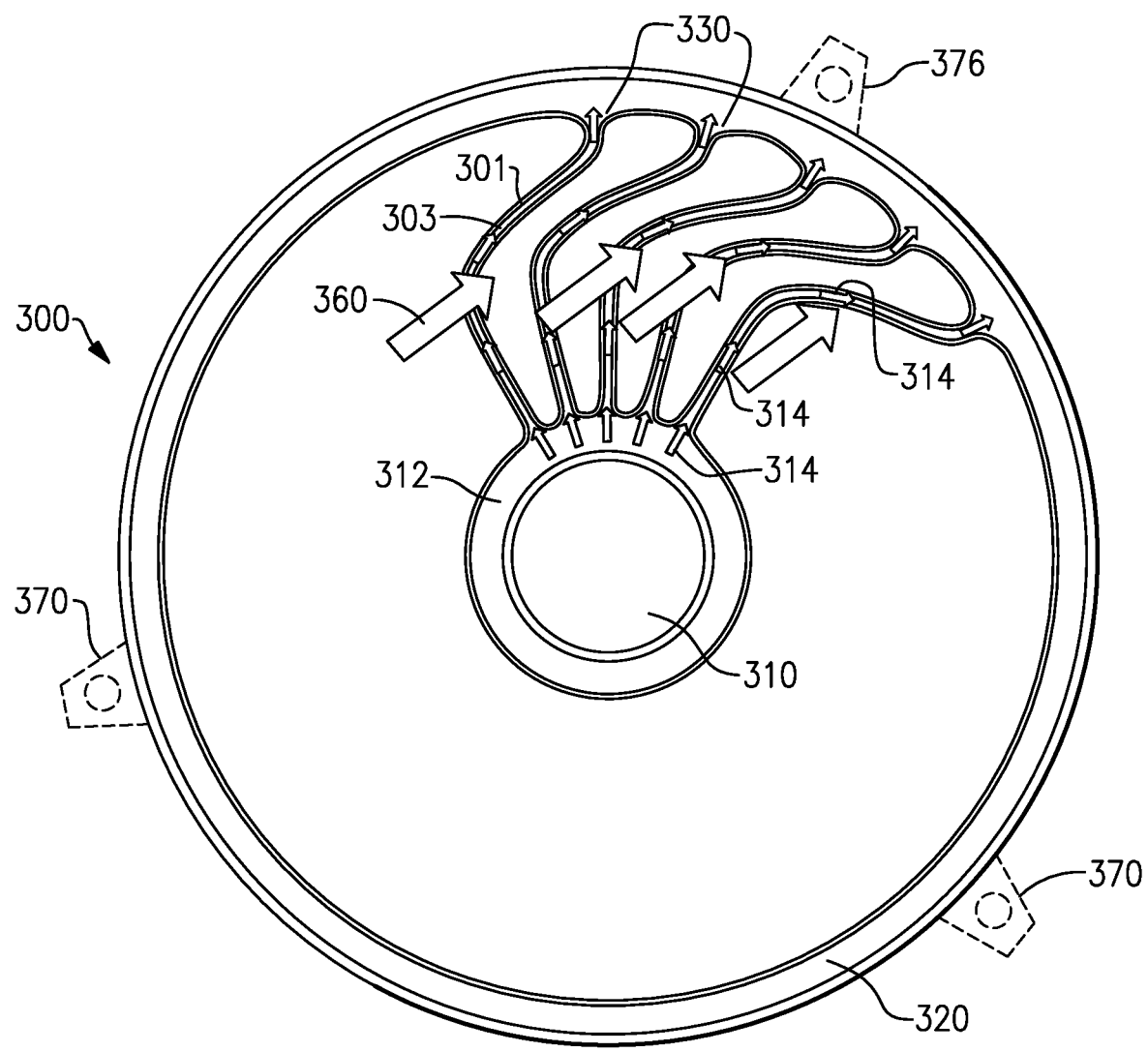
FIG. 3 schematically illustrates a section view B-B of FIG. 1.
Figure 4:
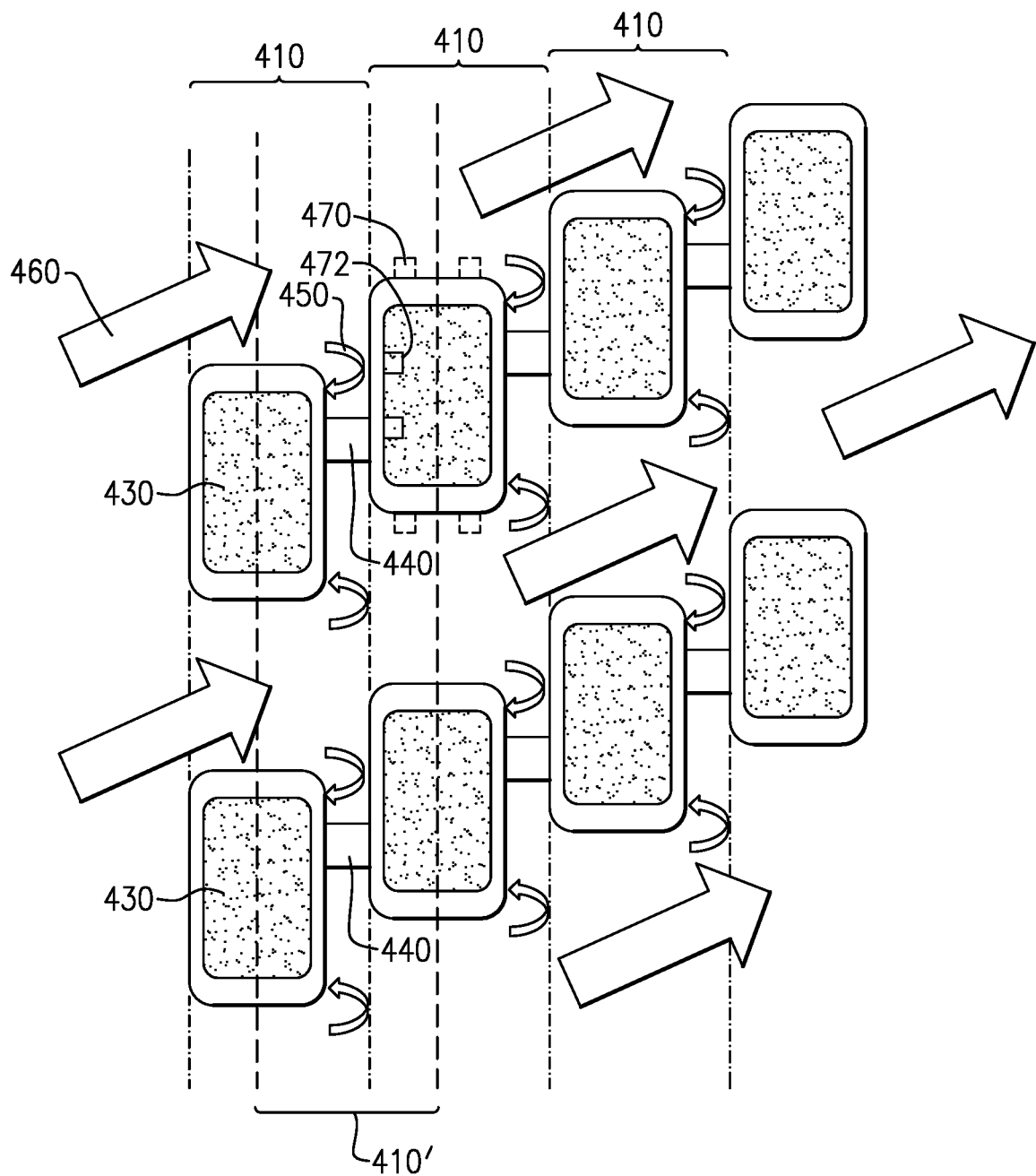
FIG. 4 schematically illustrates a section view A-A of FIG. 2.
Figure 5A:
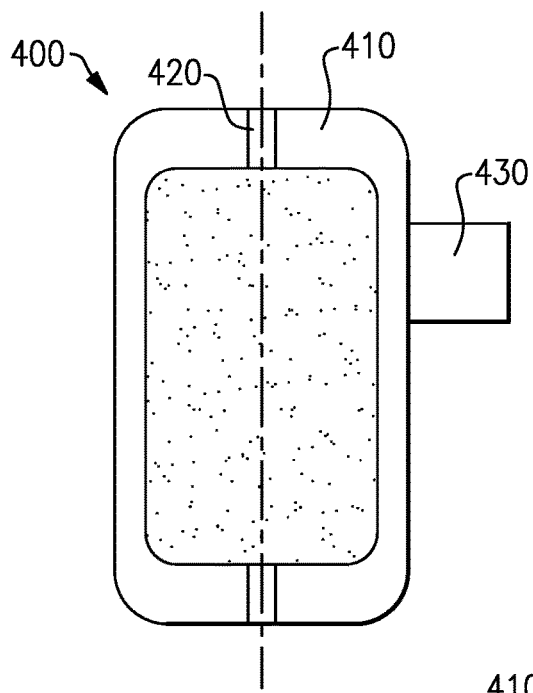
FIGS. 5A-E schematically illustrate possible cross sectional profiles of exemplary coolant passages.
Figure 5B:
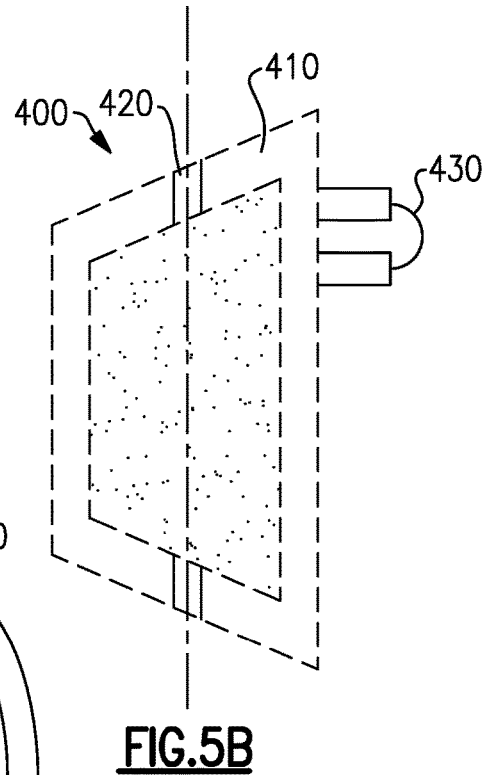
Figure 5E:
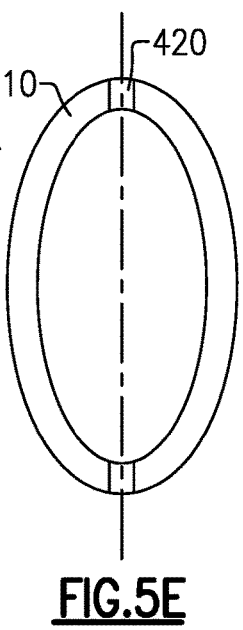
Figure 5C:
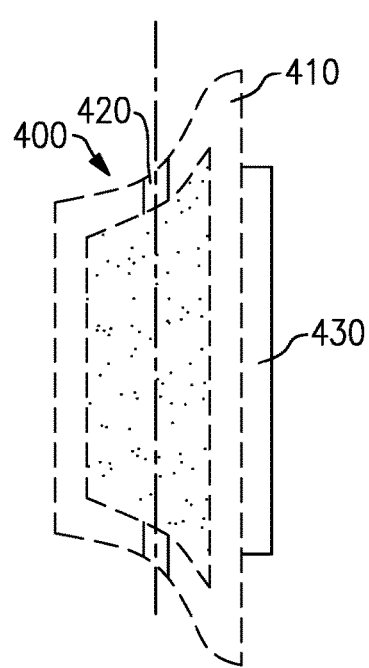
Figure 5D:
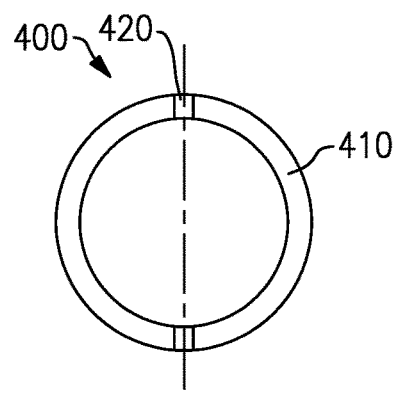

FIG. 1 schematically illustrates a side view of a heat exchanger 100 including an inlet 110, at least one outlet 140 and a heat exchanger body 102. The inlet 110 receives hot air and is connected to an internal manifold 112 within the heat exchanger body 102 via a connection flowpath 114. The internal manifold 112 is connected to an external manifold 120, also within the heat exchanger body 102, via multiple passages 130. Connected to the external manifold 120 is at least one cooled cooling air outlet 140.

The heat exchanger body 102 is constructed of multiple substantially identical stacked panels 104A, 104B, or multiple pairs 104 of stacked panels 104A, 104B, with each pair 104 being substantially identical to each other pair 104 and each panel 104A, 104B in the pair 104 being complementary to the other panel 104A, 104B, in the pair 104. Each panel 104A, 104B includes an inner circumferential structure 107 and an outer circumferential structure 105. The stacked outer and inner structures 105, 107 form the inner and outer manifolds 112, 120. Each panel 104A, 104B also includes multiple ribs, alternately referred to as ligaments, connecting the inner circumferential structure 107 to the outer circumferential structure 105. Each rib includes a channel, and is bonded to at least one rib of an adjacent panel 104A, 104B to form one of the multiple passages 130. The bonding is, in some examples, a transient liquid phase (TLP) bond. Alternatively, any similar type of bonding can be utilized in place of the TLP bond.

Transient liquid phase bonding is a hybrid brazing and diffusion bonding process that avoids the presence of a relatively weak braze material by utilizing diffusion bonding. In transient liquid phase diffusion bonding, one or more interlayers are provided in joints between segments that are to be bonded together. The component is then heated at a bonding to melt the interlayer(s), filling any gaps between the segments. Certain alloying elements of the interlayer(s) interdiffuse with the materials of the segments, causing a compositional change in the joint which isothermally solidifies and creates a bond between the two segments. The bonding temperature can be held for an additional period of time to allow more homogenous diffusion. Transient liquid phase bonding typically requires little or no pressure to be applied to the segments, and thus does not cause distortion of the segments during the process. The composition of the interlayer(s) can be selected according to the compositions of the materials of the segments that are being bonded together. Thus, the selection of first and second materials for bonded segments can be subject a mutually compatible interlayer or interlayers. Given this description, one of ordinary skill in the art will be able to select an appropriate interlayer or interlayers for the materials of their particular segments.

In some example embodiments, the panels 104A, 104B constructing the heat exchanger body 102 are grouped in pairs, with each pair forming a set of passages 130 in plane with the pair of panels. Each pair of panels 104 is substantially similar to each other pair of panels 104 making up the heat exchanger body 102. When assembled, however, each adjacent pair 104 is rotationally indexed, or clocked, relative to the immediately adjacent pairs 104 of panels 104A, 104B, as is described in greater detail below.

A first end 150 and a second end 152 of the heat exchanger body 102 are open in a region 154 between the internal manifold 112 and the external manifold 120. The open region 154 allows a cold air flow 160 to pass through the heat exchanger body 102. As the cold air flow 160 passes through the heat exchanger body 102, the passages 130 are exposed to the cold air flow 160, and heat is transferred from the passages 130 to the cold air flow 160. Spent cold air flow 160 exits the heat exchanger body 102 at the second end 152, opposite the first end 150.

In order to construct the heat exchanger 100 using the above described stacked panels, a transient liquid phase (TLP) bonding is used to connect each panel 104A, 104B to it's complimentary pair, and to connect each panel 104 to the adjacent panels 104. Utilization of TLP bonding, or similar bonding processes, allows the panels 104 to be constructed of a wide range of alloys including single crystal and equiax nickel super alloys. By way of example, utilization of the TLP bonding process, or similar processes, can allow the heat exchanger body 102 to be constructed of metallic, intermetallics and high-conductivity non-metallic materials that are not possible under existing heat exchanger fabrication methods.

Further, use of TLP bonding, or a similar process, allows each passage 130 to be optimized to provide the structural capability to handle the combined thermal and pressure stresses to which the specific heat exchanger 100 will be exposed. By way of example, this optimization can include the use of tortuous passages 130.

With continued reference to FIG. 1, and with like numerals indicating like elements, FIG. 2 schematically illustrates the heat exchanger of FIG. 1 from a top view. For clarity of view and ease of description, only a portion of the passages 130 are illustrated, and only across an arc 132. A practical implementation will include substantially more passages 130, and the passages 130 would extend the full circumference of the heat exchanger body 102.

Visible from the cross sectional interior view of FIG. 2, is the open region 154 between the inner manifold 112 and the outer manifold 120. Passages 130 are illustrated three panel pairs deep into the illustration. Each pair 104 of panels 104A, 104B forming a passage 130 is offset via angular rotational indexing relative to the adjacent pairs 104 of panels 104A, 104B, such that each passage 130 slightly overlaps a corresponding passage 130 in each adjacent pair 104 along an axis 101 of the heat exchanger body 102. One of skill in the art will understand that the passages 130 continue in each of the pairs 104 of panels 104A, 104B, and will continue to be clocked in a similar manner to the clocking illustrated in FIG. 2.

As can be appreciated by one of skill in the art having the benefit of this disclosure, the inlet 110 is operated at extremely high temperatures, while the outer manifold 120, which receives the cooled cooling air through passages 130, is operated at a substantially cooler temperature. As a result, the heat exchanger body 102 is subjected to severe thermal gradients across the heat exchanger body 102. Unaccounted for, such thermal gradients can cause the heat exchanger body 102 to structurally degrade and destruct via cracking. In some cases this degradation can reach a point where excessive leakage creates a loss of heat exchanger functionality.

As described above each of the passages 130 connects an inner manifold 112 to an outer manifold 120 along a tortuous flowpath. Each passage 130 includes a set of curves 134, 136 that are in plane with the pair of panels 104 making the passage 130. The curves 134, 136 allow for rib (or ligament) flexures as a controlled strain solution to relative motion caused by thermal growth of the passages 130, as well as allowing for the large thermal gradient between inner manifold 112 and the outer manifold 120.

As a further benefit of the TLP bonded, or similarly adhered, structure, the passages 130 within the heat exchanger can be finer than is possible utilizing a cast panel structure, or drawn tubing, and can include additional fine interior and/or exterior details to augment the heat exchange. In some examples, the panels 104A, 104B that form each pair 104 passages 130 are formed from laser etching, photo etching, or any other fine machining process creating channels in each of the ribs.

With continued reference to FIGS. 1 and 2, and with like numerals indicating like elements, FIG. 3 schematically illustrates a cross sectional view of a single panel 300 for a heat exchanger, such as the heat exchanger 100 of FIG. 1. As with the view of FIG. 2, only a portion of the ribs 301 are illustrated, and a practical implementation will extend the passages around the full circumference of the panel 300. Each of the ribs 301 includes a channel 303 that is paired with a corresponding channel 303 in a rib 301 of an adjacent panel 300 to form a passage 330.

During operation, hot air 314 enters an inner manifold 312 from an inlet 310. The hot air 314 then flows from the inner manifold 312 radially outward to the outer manifold 320 through channels 303. A cross flow 360 passes through the plane defined by the panel 300 into, or out of, the illustrated view. The cross flow 360 is a cooling air source, that convectively removes heat from the passages 130. As a result, when the hot air 314 discharges as flow 330, the discharged air is substantially lower in temperature.

On an outer circumference of the panel 300 are multiple registration components 370. The registration components 370 aid in alignment of multiple stacked panels 300 form pairs of panels, and alternating rotationally indexed pairs of panels 300 during the TLP, or similar, bonding phase of assembly. As described above, each of the panels 300 used in a single heat exchanger body are substantially identical. The radial positions of the registration components 370, relative to the passages 330 are a distinction between the panels 300. By utilizing distinct radial positions of the registration components 370, proper clocking of each panel 300 relative to each adjacent panel 300 within the heat exchanger is ensured.

In some examples, the registration components 370 can be removed after the panels 300 are fully bonded to the adjacent panels 300 to form the heat exchanger body. In alternative examples, the registration components can be configured to operate as mounting structures for mounting the heat exchanger within a given system, such as a housing for a gas turbine engine.

With continued reference to FIGS. 1-3, FIG. 4 illustrates a cross section view 400 of multiple stacked panel pairs 410, such as the cross sectional view A-A of FIG. 2. Each of the stacked panel pairs 410 defines passages 430 and one or more structures 440 for connecting adjacent panel pairs 410. The structures are connected or bonded at the inner diameter and the outer diameter and prevent the panels or passages from vibrating independently. The connection between each layer 410 via 440 can be a bond, or surface to surface contact with no bond in examples where bonding material is preferentially absent at this location. In alternative examples, the stacked panel structure can be formed of multiple individual stacked panels, with each panel forming half of two adjacent passages. Panel configuration 410' illustrates an example configuration of a panel forming half of two adjacent passages.

During operation, as the cooling air is passed over the passages 130, a local turbulence 450 is introduced immediately downstream of each passage 430, due to the staggered arrangement of the passages 430. The turbulence 450 further increases the ability of the cooling flow 460 to absorb heat from the passages 430, and facilitates full cooling of all of the passages 430.

In some examples, one or more of the passages 430 can include augmentation elements 470 protruding outward from the external surface of the passage 430 and into the cooling stream 460. By way of example, the augmentation elements 470 can be chevrons, pins, fins, or any other heat transfer augmentation feature. The augmentation elements 470 increase the surface area of the passage 430 that is exposed to the cooling flow 460, thereby increasing the amount of cooling that can be achieved. In alternative examples, the augmentation elements 470 can further direct, or control, the cross flow 460 in addition to enhancing the cooling. In yet further examples, augmentation features 472 can be included and can protrude inward into the interior of the passage.

With continued reference to FIGS. 1-4, FIGS. 5A-E schematically illustrates cross sectional views of alternate passage profiles 400. Each of the passage profiles 400 is shown approximately normal to an expected direction of fluid flowing through the passage. While illustrated as any of a rectangular profile with chamfered corners (5A), a trapezoidal profile (5B), a complex profile (5C), a circular profile (5D), or an elliptical profile (5E), one of skill in the art will understand that any desirable passage profile, or combination of passage profiles, can be created and utilized depending on the specific pressure and flow rate needs of the given system.

Each profile includes an outer wall 410 formed of two ribs, or ligaments. Each of the ribs is a rib of a panel pair, and the ribs are joined via a bond layer 420, such as a TLP bond layer. Each rib connects an inner circumference of the corresponding panel to an outer circumference of the corresponding panel. Prior to bonding, each rib includes a channel that is created in the rib via laser etching, photo etching, or any similar fine machining technique.

In some examples, the wall 410 includes augmentation elements 430 protruding outward from the outer surface of the wall 410. As with the channels, each of the augmentation elements 430 is created using a fine machining technique.

Figure 6:
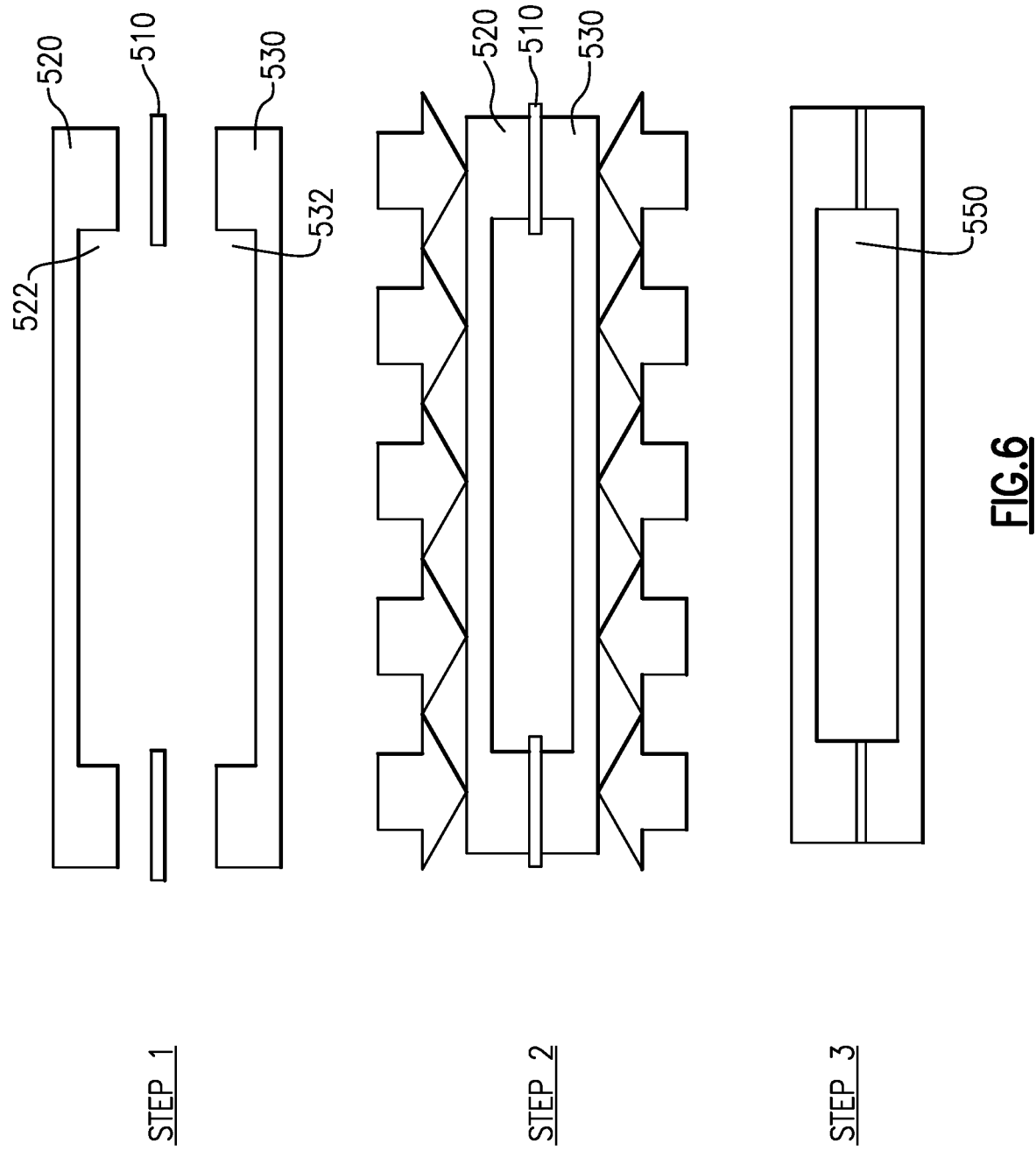
FIG. 6 schematically illustrates a three step process for bonding the stacked panels of stacked panel heat exchanger, and the creation of the cooled coolant channels.

With continued reference to FIG. 5, FIG. 6 schematically illustrates a three step bonding process utilized to create the passages of any of the above described heat exchangers. In step 1, a bonding layer 510 is positioned between two aligned ribs 520, 530. Each of the ribs 520, 530 includes a channel 522, 532 which forms half of a resultant passage 550.

Once the panels are fully aligned, the ribs 520, 530 are brought into contact with each other and large amounts of pressure are applied compressing the bond layer 510 between each of the ribs 520, 530. Due to the pressure and temperature, the bond layer reacts and diffuses into each of the ribs 520, 530, and the ribs 520, 530 are bonded together.

Once the ribs 520, 530 have been fully bonded, the pressure is removed in step 3, and the paired panels are bonded together. In some examples the paired panels are then bonded to adjacent panels using the aforementioned rotational indexing to form a stacked panel configuration. In alternative examples, all the panels in a given heat exchanger body can be simultaneously bonded together as a single stack.

In further alternative examples, each panel can include ribs with channels facing one direction, and ribs with channels facing the opposite direction. In such an example, the ribs facing the first direction are paired with a corresponding adjacent panel, such as the panel immediately above the ribs, and the ribs facing the second direction are paired with another corresponding adjacent panel, such as the panel immediately below the ribs, opposite the first adjacent panel. This configuration can be configured as deep as necessary to ensure that sufficient cooling flow is allowed through the passages.

While illustrated and described herein as a circular heat exchanger, one of skill in the art having the benefit of this disclosure, will understand that alternative form factors, such as rectangular, pentagonal, hexagonal, or any similar shaped cross section could be utilized to the same effect with only minimal modification of the design described herein.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A heat exchanger comprising:
    a heat exchanger body comprising a plurality of stacked panels defining an internal manifold and an external manifold;
    each of said stacked panels including an internal structure partially defining the internal manifold, an external structure partially defining the external manifold, and a plurality of ribs connecting the internal structure to the external structure;
    wherein each of said ribs further comprises a channel protruding into said rib and being paired with a corresponding rib of an adjacent panel, such that each of said ribs and the corresponding rib defining a tortuous cooling passage fluidly connecting the internal manifold to the external manifold, the tortuous cooling passage being in plane with a pair of said stacked panels and being configured to allow thermal growth of the passage without requiring thermal growth of the external manifold; and
    each of said stacked panels being bonded to at least one adjacent stacked panel.

2. The heat exchanger of claim 1, wherein each of said stacked panels is bonded to at least one adjacent stacked panel via a transient liquid phase bond.

3. The heat exchanger of claim 1, wherein each of said passages includes at least one augmentation element extending outward from an outer surface of the passage.

4. The heat exchanger of claim 3, wherein the augmentation element includes at least one of a chevron, a pin, and a fin.

5. The heat exchanger of claim 1, wherein each of said passages includes at least one augmentation element extending inward from an inner surface of the passage.

6. The heat exchanger of claim 5, wherein each of said passages includes at least one augmentation element extending outward from an outer surface of the passage.

7. The heat exchanger of claim 1, wherein each of said stacked panels includes an open region configured to allow a cooling flow to flow across each of said passages.

8. The heat exchanger of claim 7, wherein each of said stacked panels is clocked, relative to a radial alignment of each adjacent panel, such that said passages are staggered circumferentially.

9. The heat exchanger panel of claim 8, wherein each of said passages partially axially overlaps at least one passage in an adjacent plane.

10. The heat exchanger panel of claim 9, wherein each of said passages defines a local turbulence immediately downstream of the passage within said cooling flow.

11. The heat exchanger of claim 1, wherein each of said panels includes at least one registration component, and wherein each registration component is aligned with one registration component of all of said plurality of panels.

12. The heat exchanger of claim 11, wherein each of said registration component further comprises an engine mount.

13. The heat exchanger of claim 1, wherein each of said passages includes a cross section normal to an expected fluid flow direction through the passage, and wherein said cross section is one of circular, trapezoidal, and rectangular.

14. The heat exchanger of claim 1, wherein each panel comprises a vibrational coupling feature connecting the panel to at least one adjacent panel such that the panels are vibrationally coupled, and wherein the vibrational coupling feature is connected to the at least one adjacent panel via one of a bonding coupling and a contact coupling.

15. The heat exchanger of claim 1, wherein the tortuous cooling passage includes a plurality of curves in plane with the pair of stacked panels.

* * * * *